United States Patent
Dougherty et al.

(10) Patent No.: US 10,972,609 B2
(45) Date of Patent: Apr. 6, 2021

(54) CALLER DEFLECTION AND RESPONSE SYSTEM AND METHOD

(71) Applicant: Nuance Communications, Inc., Burlington, MA (US)

(72) Inventors: Theodore Dougherty, Denver, CO (US); Adam Mak, Ontario (CA)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 16/398,652

(22) Filed: Apr. 30, 2019

(65) Prior Publication Data

US 2020/0153969 A1 May 14, 2020

Related U.S. Application Data

(63) Continuation-in-part of application No. 16/186,502, filed on Nov. 10, 2018.

(51) Int. Cl.
*H04M 3/00* (2006.01)
*H04M 5/00* (2006.01)
(Continued)

(52) U.S. Cl.
CPC ........... *H04M 3/5231* (2013.01); *G10L 17/00* (2013.01); *G10L 17/06* (2013.01); *H04M 3/5166* (2013.01);
(Continued)

(58) Field of Classification Search
CPC ....... H04M 2203/6045; H04M 3/5166; H04M 2201/41; H04M 2203/6054;
(Continued)

(56) References Cited

U.S. PATENT DOCUMENTS 7,461,056 B2 12/2008 Cao et al.
7,574,358 B2 8/2009 Deligne et al.
(Continued)

FOREIGN PATENT DOCUMENTS

KR 20050009770 1/2005

OTHER PUBLICATIONS

International Search Report and Written Opinion dated Jan. 30, 2020 issued in corresponding International Application No. PCT/US2019/060913.

*Primary Examiner* — Ahmad F. Matar
*Assistant Examiner* — Kharye Pope
(74) *Attorney, Agent, or Firm* — Womble Bond Dickinson (US) LLP

(57) ABSTRACT

Provided are a call deflection and response system and method, wherein a voice call from a caller device is received, a skill group is determined to resolve an issue associated with the call, and a callback or a text response to the issue is provided to the caller device, providing a context-based personalized response. A caller leaves a detailed voicemail explaining an issue needing resolution, which is electronically transcribed and then run through a classifier to determine concepts and intents associated with the call. Based on the concepts and intents, responsibility for the call and associated files are transferred to a particular skill group on a response system for resolution. A response entity from the appropriate skill group determines and provides an issue response via callback or text message to the caller device, e.g., to the caller's mobile phone.

24 Claims, 10 Drawing Sheets

(51) Int. Cl.
  *H04L 12/66* (2006.01)
  *H04M 3/523* (2006.01)
  *H04M 3/51* (2006.01)
  *H04M 3/533* (2006.01)
  *G10L 17/06* (2013.01)
  *G10L 17/00* (2013.01)

(52) U.S. Cl.
  CPC ....... *H04M 3/5183* (2013.01); *H04M 3/5233* (2013.01); *H04M 3/53333* (2013.01); *H04M 2203/6045* (2013.01)

(58) Field of Classification Search
  CPC .... H04M 3/4936; H04M 3/51; H04M 3/5183; H04L 63/0861; H04L 67/306; H04L 63/102; H04L 63/08; H04L 2463/082; H04L 9/3231; H04L 63/0876; G10L 25/51; G10L 17/005; G10L 17/06; G06K 2009/00939; G06K 9/00885; G06K 9/00892; G06Q 20/40145; G06Q 20/32; G06Q 20/4014
  USPC .............. 379/265.09, 265.01, 88.01, 265.02, 379/266.01, 309, 210.01; 370/352
  See application file for complete search history.

(56) References Cited

U.S. PATENT DOCUMENTS

| | | |
|---|---|---|
| 7,936,867 B1 | 5/2011 | Hill et al. |
| 8,165,281 B2 | 4/2012 | Joseph et al. |
| 8,326,643 B1 | 12/2012 | Eshkenazi et al. |
| 8,328,157 B2 | 12/2012 | Schulz et al. |
| 8,391,464 B1 | 3/2013 | Sharp |
| 8,423,363 B2 | 4/2013 | Gupta et al. |
| 8,667,072 B1 | 3/2014 | Cordell et al. |
| 8,756,065 B2 | 6/2014 | Melamed et al. |
| 8,787,553 B2 | 7/2014 | Fan et al. |
| 8,942,685 B2 | 1/2015 | Weksler et al. |
| 8,964,946 B1 | 2/2015 | Scheet et al. |
| 9,065,915 B1 | 6/2015 | Lillard et al. |
| 9,105,268 B2 | 8/2015 | Srivastava et al. |
| 9,106,748 B2 | 8/2015 | Conway et al. |
| 9,148,512 B1 | 9/2015 | Kumar et al. |
| 9,232,063 B2 | 1/2016 | Romano et al. |
| 9,247,066 B1 | 1/2016 | Stec et al. |
| 9,258,414 B2 | 2/2016 | Odinak et al. |
| 9,263,038 B2 | 2/2016 | Flaks et al. |
| 9,706,051 B2 | 7/2017 | Truitt et al. |
| 9,734,831 B2 | 8/2017 | Timem et al. |
| 9,848,082 B1 * | 12/2017 | Lillard ................ H04M 3/5231 |
| 10,074,089 B1 | 9/2018 | Rangaraj et al. |
| 10,277,743 B1 | 4/2019 | Agarwal et al. |
| 10,601,995 B2 | 3/2020 | Feast et al. |
| 10,735,363 B1 * | 8/2020 | Knas ...................... H04L 51/04 |
| 2005/0010411 A1 | 1/2005 | Rigazio et al. |
| 2006/0023863 A1 | 2/2006 | Joseph et al. |
| 2006/0195321 A1 | 8/2006 | Deligne et al. |
| 2006/0206306 A1 | 9/2006 | Cao et al. |
| 2007/0168537 A1 * | 7/2007 | Misra ................ H04L 29/06027 709/230 |
| 2009/0097634 A1 * | 4/2009 | Nambiar ............ H04M 3/5183 379/265.09 |
| 2009/0326947 A1 * | 12/2009 | Arnold ................... G06Q 30/02 704/257 |
| 2010/0161315 A1 | 6/2010 | Melamed et al. |
| 2010/0179811 A1 * | 7/2010 | Gupta ..................... G10L 15/22 704/235 |
| 2010/0276618 A1 * | 11/2010 | Schulz ................... B60T 8/363 251/129.15 |
| 2012/0114112 A1 | 5/2012 | Rauschenberger et al. |
| 2013/0077775 A1 | 3/2013 | Fan et al. |
| 2014/0024350 A1 | 1/2014 | Bouzid et al. |
| 2014/0079195 A1 | 3/2014 | Srivastava et al. |
| 2014/0098949 A1 | 4/2014 | Williams |
| 2014/0119531 A1 | 5/2014 | Tuchman et al. |
| 2014/0314225 A1 | 10/2014 | Riahi et al. |
| 2014/0355748 A1 * | 12/2014 | Conway ................ H04M 3/523 379/265.1 |
| 2014/0364093 A1 | 12/2014 | Weksler et al. |
| 2014/0379525 A1 | 12/2014 | Timem et al. |
| 2015/0100302 A1 * | 4/2015 | Flaks .................. G10L 15/1822 704/9 |
| 2015/0189086 A1 * | 7/2015 | Romano ............. H04M 3/5175 379/265.09 |
| 2015/0222751 A1 * | 8/2015 | Odinak ................... H04W 4/12 379/265.09 |
| 2015/0312416 A1 | 10/2015 | Cahill et al. |
| 2016/0125884 A1 * | 5/2016 | Timem ..................... G06F 21/32 704/273 |
| 2016/0156781 A1 * | 6/2016 | Truitt .................. H04L 63/0428 379/142.05 |
| 2017/0289355 A1 | 10/2017 | Mezhibovsky et al. |
| 2018/0004375 A1 | 1/2018 | Friend et al. |
| 2018/0018613 A1 | 1/2018 | Richardson et al. |
| 2018/0054525 A1 | 2/2018 | Mezhibovsky et al. |
| 2018/0234520 A1 | 8/2018 | Ford et al. |
| 2018/0255180 A1 | 9/2018 | Goldberg et al. |
| 2018/0285413 A1 * | 10/2018 | Vora ....................... G06N 5/041 |
| 2019/0158671 A1 | 5/2019 | Feast et al. |
| 2019/0213242 A1 | 7/2019 | Pathak et al. |
| 2019/0295163 A1 | 9/2019 | Zurick et al. |
| 2020/0097148 A1 * | 3/2020 | Arora ....................... G06F 9/452 |
| 2020/0150839 A1 * | 5/2020 | Roisman ................... H04L 51/02 |

* cited by examiner

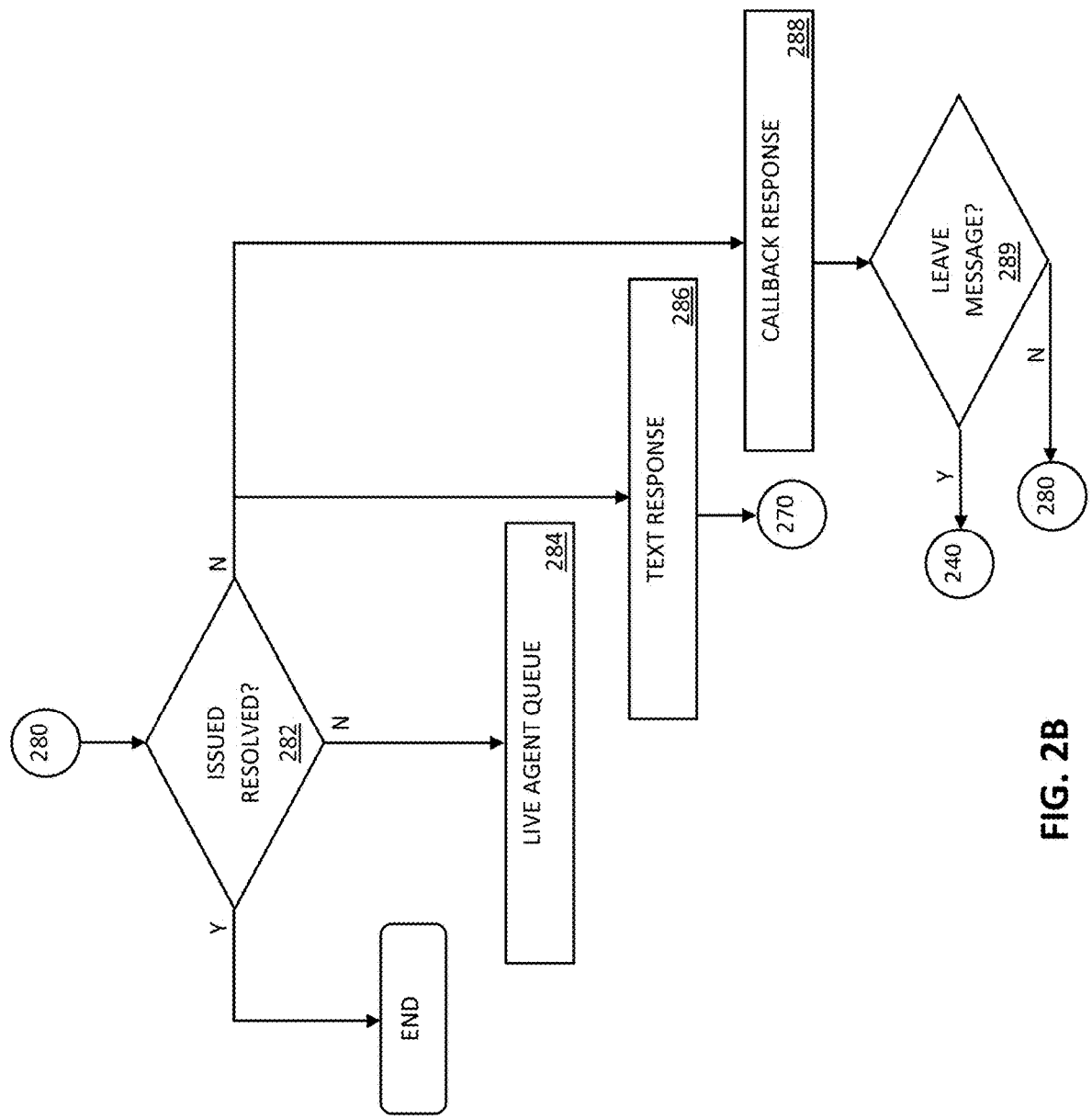

US 10,972,609 B2

CALLER DEFLECTION AND RESPONSE SYSTEM AND METHOD

CROSS REFERENCE TO RELATED APPLICATIONS

The present application is a continuation-in-part application of U.S. patent application Ser. No. 16/186,502 filed Nov. 10, 2018, entitled CALLER DEFLECTION AND RESPONSE SYSTEM AND METHOD, the contents of which are incorporated by reference.

FIELD OF INTEREST

The present inventive concepts relate to the field of call response systems, and more particularly to customer call response systems using interactive voice response (IVR).

BACKGROUND

Customer service phone calls are frequently handled, at least initially, by an interactive voice response (IVR) system. Most digital transformation initiatives at enterprises feature a requirement to deflect and offload phone calls to agents to lower-cost digital channels. This often includes an offer to engage the caller with a chat agent who will open up a chat session with the caller, forcing that caller to start the resolution process over.

For instance, in existing IVR to SMS deployments, the caller is offered an opportunity to chat with an agent. If the caller opts for that option, the caller will receive an offer to chat via an SMS, but the chat agent has no other information about the caller. They are starting from scratch, even though the caller may have gone through numerous IVR prompts, has waited on hold, and typically has given some amount of information to the IVR by virtue of spoken or DTMF-based response.

That is, the new resolution process forces the customer to engage in an often lengthy communication process, with numerous back and forth text messages required to resolve an issue. As more and more calls are deflected in this manner, this creates the potential for another bad customer experience in the Short Message Service (SMS) texting channel, as has happened in the interactive voice response (IVR) voice channel.

Some IVRs allow virtual queuing, rather than deflecting the caller to a chat agent. Virtual queuing allows a caller that is on hold and in a queue waiting for a customer service agent to become available, to have an agent call them back rather than wait on hold. If the caller opts for that option, they will receive a callback, but the customer service agent will have limited information about the caller. They are sometimes starting from scratch, even though the caller may have gone through numerous IVR prompts, has waited on hold, and typically has given some amount of information to the IVR by virtue of spoken or DTMF-based responses.

SUMMARY

Provided are a deflection and response system and method. In accordance with the inventive concepts, such systems and methods deflect voice calls received from an IVR system to a deflection and response system having text capability and/or a call back (of call after) capability. The deflection and response system is configured to resolve a caller's issue by replying with a context-based personalized response in the form of a text message, e.g., a SMS/MMS/RCS text message, or with a callback by an informed callback agent.

The system enables the method by allowing individuals to state an issue to be resolved, i.e., the reason for the call. The caller's audio inputs are recorded and processed to determine a caller intent from information determined, at least in part, from the audio input. The intent can be a request for a problem solution and/or information, as examples. The system further enables the method by determining an appropriate response entity for resolution and directing information and data files associated with the caller and the caller's intent to the response entity. Having access to such information and data files, the response entity can perform research and/or troubleshooting useful for determining a response associated with the resolution to the caller's issue. The response can be from a chat agent via a text message to the caller's electronic device (e.g., mobile phone) and/or a callback from a call agent, each a response entity. The text message could include alphanumeric words, phrases, numbers, icons, graphics, audio, video, hyperlinks, and the like, and/or combinations of two or more thereof.

Systems and methods in accordance with the inventive concepts provide, therefore, an improved caller (or customer) experience, with service delivered at a far lower cost than provided by existing approaches. Each successfully deflected call yields an immediate financial benefit in the form of lower cost of transaction, and potentially a mid- and long-term benefit for an entity servicing the caller by moving the caller (or customer) from a high-cost service channel (live voice) to a lower cost digital channel (chat) or to a callback channel.

In accordance with aspects of the inventive concepts, provided is a callback method, carried out by a plurality of processors accessing one or more computer memory. The method comprises electronically transcribing at least one audio file to form an electronic transcription, the at least one audio file associated with an audio call describing an issue; processing the electronic transcription to determine concepts and intents of the audio call; determining a skill group from a plurality of skill groups based on the determined concepts and intents, the concepts and intents indicating a subject matter of the issue and the skill group having a predetermined association with the subject matter; and electronically forwarding the transcription to a response system including the skill group for determining an issue response. The method further includes electronically initiating a callback to a caller device associated with the audio call by a callback processor.

In various embodiments, the method further comprises electronically forwarding the at least one audio file and/or a transcription confidence score to the response system.

In various embodiments, the method further comprises electronically authenticating a caller and/or the caller device associated with the audio call.

In various embodiments, electronically authenticating the caller and/or the caller device includes using voice biometrics authentication processing.

In various embodiments, the method further comprises electronically accessing stored account information associated with the authenticated caller and/or the caller device and electronically forwarding the stored account information to the response system.

In various embodiments, the method further comprises an interactive voice response (IVR) system applying natural language processing and/or conversational artificial intelligence to engage in a dialog during the audio call with the caller device to obtain the at least one audio file. The method further comprises, before determining the issue response, the IVR system terminating the audio call and a text processor sending an acknowledgment text message to the caller device.

In various embodiments, transcribing the at least one audio file includes processing the at least one audio file using natural language processing.

In various embodiments, the method further comprises automatically prepopulating fields in an electronic preformatted response template with data based on the transcription and electronically forwarding the electronic response template to the response system.

In various embodiments, the method further comprises the response system electronically accessing one or more knowledge bases or systems to obtain information related to the subject matter.

In various embodiments, the method further comprises receiving audio content from the caller device via the audio call, storing the audio content as the at least one audio file, terminating the audio call with the caller device, and texting an acknowledgement to the caller device.

In accordance with another aspect of the inventive concepts, provided is a callback system. The system comprises a transcription processor configured to electronically transcribe at least one audio file to form an electronic transcription, the at least one audio file associated with an audio call describing an issue. The system also includes a classifier configured to analyze the electronic transcription to determine concepts and intents of the audio call, the concepts and intents indicating a subject matter of the issue, and to determine a skill group from a plurality of skill groups based on the determined concepts and intents, the skill group having a predetermined association with the subject matter. And the system includes a deflection processor configured to electronically forward the transcription to a response system including the skill group for determination of an issue resolution. The system further includes a callback processor configured to initiate an audio callback to a caller device associated with the audio call.

In various embodiments, the deflection processor is further configured to electronically forward the at least one audio file and/or a transcription confidence score to the response system.

In various embodiments, the system further comprises an authentication processor configured to electronically authenticate a caller and/or the caller device associated with the audio call.

In various embodiments, the authentication processor is configured to electronically authenticate the caller and/or the caller device using voice biometrics authentication processing.

In various embodiments, the authentication processor is configured to electronically access stored account information associated with the authenticated caller and/or the caller device and the deflection processor is configured to electronically forward the stored account information to the response system.

In various embodiments, the system further comprises an interactive voice response (IVR) system configured to apply natural language processing and/or conversational artificial intelligence to engage in a dialog with the caller device to obtain the at least one audio file. The IVR system is configured to terminate the audio call and the deflection and response system further comprise a text processor configured to send an acknowledgment text message to the caller device in response to termination of the call.

In various embodiments, the transcription processor is configured to transcribe the at least one audio file includes processing the at least one audio file using natural language processing.

In various embodiments, the system is configured to automatically prepopulate fields in an electronic preformatted response template with data based on the transcription and electronically forward the electronic response template to the response system.

In various embodiments, the response system is configured to electronically access one or more knowledge bases or systems to obtain information related to the subject matter.

In various embodiments, the system is configured to receive audio content from the caller device via the audio call, store the audio content as the at least one audio file, terminate the audio call with the caller device, and text an acknowledgement to the caller device.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings:

FIG. 2B is an embodiment of an optional method out of a callback response session, in accordance with aspects of the inventive concepts;

DETAILED DESCRIPTION OF PREFERRED EMBODIMENTS

Figure 1:
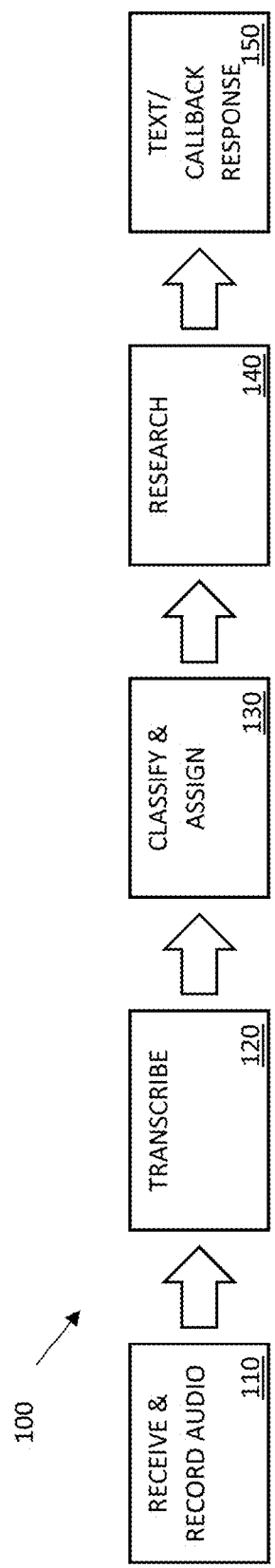
FIG. 1 is flow diagram representing an embodiment of aspects of a call deflection and response method, in accordance with aspects of the inventive concepts.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items. The term "or" is not used in an exclusive or sense, but in an inclusive or sense.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

Provided are a call deflection and response system and method. In accordance with the inventive concepts, such systems and methods can receive voice calls via an interactive automated response system and determine an intent of the caller, and enable a response entity reply with a context-based personalized response in the form of an informed callback or a content-based text message, e.g., a personalized SMS/MMS/RCS/iMessage text message. In accordance with aspects of the inventive concepts, the system and method improve upon existing approaches by allowing callers to leave a detailed reason for their call, e.g., as a voicemail, and later receive a responsive callback and/or text message or session.

The deflection and response system can utilize a callback platform and/or a chat platform, e.g., to a live chat agent or chatbot (collectively, a "chat entity"), to more quickly resolve the caller's issue. A "chatbot" is computer program that, when executed, simulates a text conversation with human users, while a chat agent tends to be a human. The resolution is provided via text message to the caller, e.g., to the caller's mobile phone. The caller can, if necessary, respond to the text message and engage in a chat session to further pursue the issue, if necessary. The callback platform can direct the caller's information and data files (e.g., including voice message transcription) to a call agent informed and prepared to address the caller's issue. A chat entity, e.g., a chatbot or chat agent, and a callback agent may each be referred to more generally as a "response entity" with respect to the original call and recorded voice message.

Figure 2:
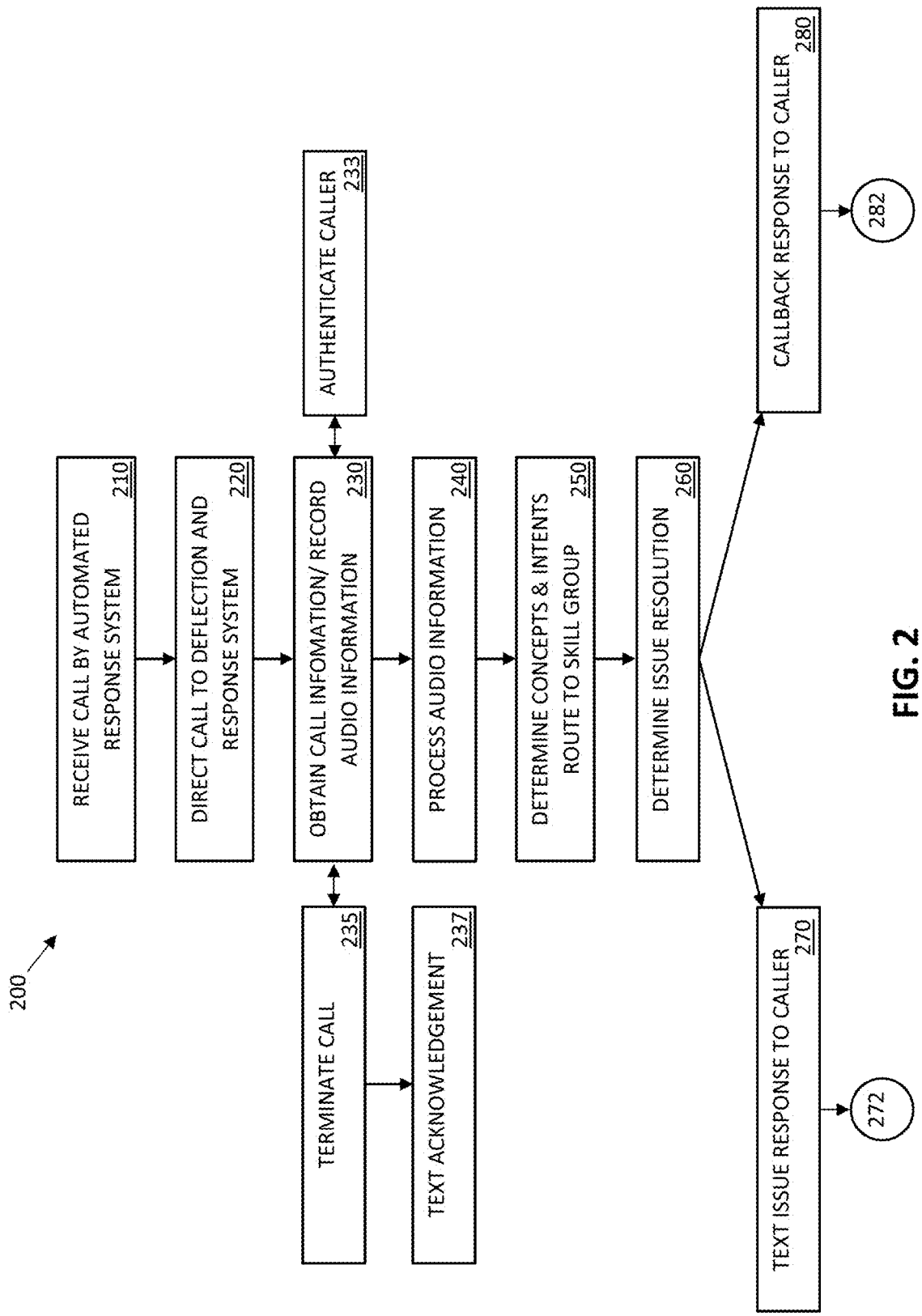
FIG. 2 is an embodiment of a more detailed call deflection and response method, in accordance with aspects of the inventive concepts.
Figure 3:
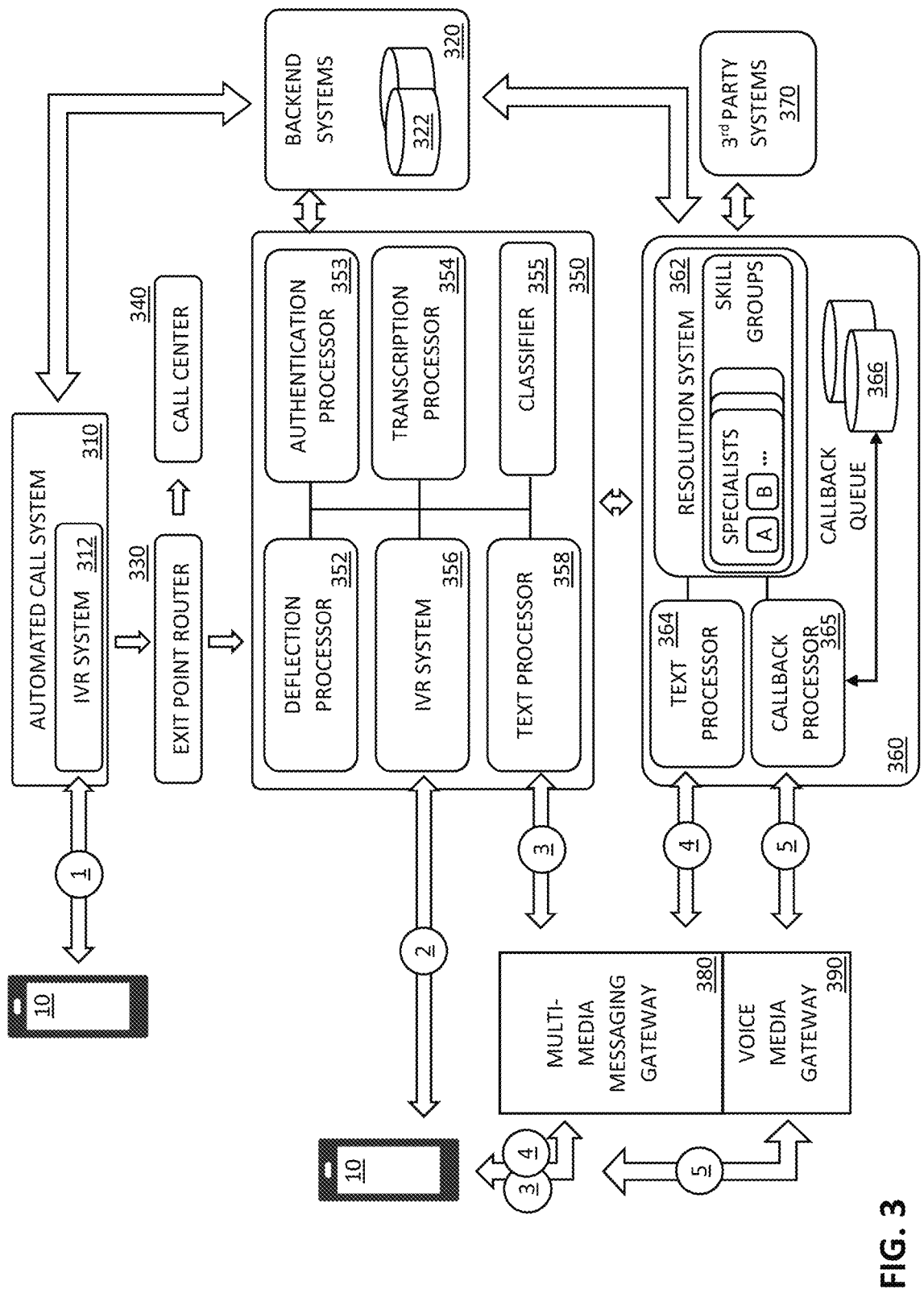
FIG. 3 is an embodiment of a call deflection and response system, in accordance with aspects of the inventive concepts.

FIG. 1 is flow diagram 100 representing an embodiment of aspects of the deflection and response method, in accordance with aspects of the inventive concepts. FIG. 2 provides a more detailed flow diagram of an embodiment of interaction between the deflection and response system and a caller. FIG. 3 provides an embodiment of a deflection and response system 350.

Referring to FIG. 1, in block 110, the deflection and response system 350 receives a call from a caller device 10 and records audio from the caller, e.g., which can take the form of a voicemail left through interaction with an IVR system 312 or 356. In block 120, the recorded audio files are transcribed into text files. In block 130, the transcribed text files are analyzed by a classifier to determine concepts and intents of the caller and, based thereon, responsibility for the call is selectively assigned and routed to an appropriate skill group, e.g., from among a plurality of skill groups. The concepts and intents indicated a subject matter of the caller's issue. Each skill group can have a predetermined association with the subject matter, e.g., billing, technical support, cable service, Internet service, and so on. Based on the concepts and intents, a subject matter and skill group can be determined, e.g., using natural language processing of the transcription text files to understand concepts and intents in the caller's audio file. Within a skill group, there can be one or more specialists equipped to determine an issue resolution. The skill group is preferably selected, therefore, based on the concepts and intents of the caller. Specialists from each skill group preferably have access to systems-of-record and resources needed to enable research and resolution of the caller's issue. That is, from the recorded and transcribed audio and determined concepts and intents, one or more caller issues can be determined requiring resolution, e.g., billing questions, service interruption, and/or service modification.

In block 140, a specialist from the selected skill group researches the issue and determines a resolution. In block 150, the specialist (a response entity) completes the resolution process by replying to the caller's device with a callback or with a personalized context-based SMS/MMS/RCS/iMessage or other text message, which can include a free form answer and one-time rich media link, as examples. In some embodiments, the determination of whether the response is a callback or a text response is based on the caller's choice among the two options during the initial call with the automated call system 310 (and IVR system 312). In some embodiments, the response could be a callback even if the caller chose a text response, e.g., if the classification and skill group assignment in block 130 was unsuccessful or the research in block 140 did not yield a result and further information were required. Although, in some embodiments, if a text response was chosen and the classification and skill group assignment in block 130 was unsuccessful or the research in block 140 did not yield a result, the response could be a text message soliciting more information and/or initiating a chat session.

FIG. 2 is a flowchart of a more detailed embodiment of a call deflection and response method 200, in accordance with aspects of the inventive concepts.

In step 210, an automated call system 310 receives a call (see arrow 1) from a caller device 10, e.g., a mobile phone. The automated call system 310 can be configured to service at least one business, governmental, charitable, or other organization, and can form part of the enterprise system 200. The automated call system 310 can include an interactive voice response (IVR) system 312 configured to interact with the caller using a caller device 10, such as a mobile phone, computer, tablet, phablet, or other call device. Although a mobile phone 10 is depicted, it is not at the exclusion of other electronic communication devices or systems. Interaction between the automated call system 310 and the caller (via caller device 10) enables the automated call system 310 to receive information from the caller device 10, which can include audio inputs, keypad entries, a phone number or other identification of the caller device 10, and so on.

Optionally, the automated call system 310 can be configured to provide some level of authentication using backend systems 320, which can include an authentication processor, a customer relationship management (CRM) system, and databases or knowledge bases 322, and/or other systems and databases having information and resources useful or necessary for obtaining the call information.

In response to inputs from the caller device 10, the automated call system 310 determines a destination for the call to one or more possible exit points. In particular, the automated call system 310 can be configured with capabilities to forward responsibility for the call to one or more exit points via an exit point router 330. The exit points can include the deflection and response system 350 and, in some embodiments, one or more other possible exit points, such as a call center 340 with live and/or automated call agents. In step 220, the automated call system 310 directs the call to the deflection and response system 350 via the exit point router 330.

In various embodiments, the automated call system 310 can be configured to automatically transfer responsibility for the call to the deflection and response system 350 (as an exit point) in response to satisfaction of one or more criteria or the existence of one or more conditions. As examples, such criteria and/or conditions can include one or more predetermined criteria and/or conditions, such as a wait time estimated at or above a threshold as calculated by a wait time counter, an elapsed amount of wait time (e.g., an elapsed amount of time at or beyond a present threshold time limit) as calculated by the wait time counter, and/or an identity of the caller, a caller account, and/or the caller device 10. Other conditions could additionally or alternatively exist for automatically initiating call transfer to the deflection and response system 350 as an exit point.

In various embodiments, the automated call system 310 can be configured to allow the caller to select or initiate transfer of responsibility for the call to the deflection and response system 350, e.g., by pressing a keypad button or submitting an appropriate and/or predetermined audio response via the caller device 10. In such embodiments, the automated call system 310 could be configured to solicit an input from the caller device 10 to affect a call transfer to the deflection and response system 350 via the exit point router 330.

In some embodiments, step 220 can include indicating a response type within the deflection and response system 350, e.g., a text response or a callback response. In some embodiments, the response type can be determined based on the caller's inputs during its exchange with the IVR system 312. For example, the automate call system 310 can solicit a response type choice from the caller (device 10), e.g., in the exchange indicated by arrow 1 in FIG. 3.

The deflection and response system 350 can be local or remote to other components of an enterprise system, such as an enterprise system that includes the automated call system 310 and/or the backend systems 320. In various embodiments, the automated call system 310 can be configured to transfer responsibility for the call to the deflection and response system 350 by one or more computer transfer mechanisms (e.g., TNT/Transfer Connect, SIP Refer, etc.).

In step 230, the deflection and response system 350 receives the transferred call from the exit point router 330. The deflection and response system 350 includes a deflection processor 352 responsible for overall management and tasking of the deflection and response system 350 and its components. The deflection processor 352 tasks an IVR system 356 to take over the call and engage with caller device 10 (see arrow 2) to obtain call information. The IVR system 356 can be, in some embodiments, a Conversational Interactive Voice Response IVR by Nuance Communications.

In various embodiments, the deflection and response system 350 optionally includes an authentication processor 353 configured to authenticate the caller, the caller device 10, and/or a caller account, in step 233. The IVR system 356 can be configured to engage with the caller to obtain information necessary or useful by the authentication processor 353. In some embodiments, the authentication processor 353 can interact with the various backend systems 320, as needed, for the authentication process. Authenticated caller's data can be written to an encrypted folder and passed as electronic files via a web service to the deflection and response system 350, which can be adapted to comply with enterprise security requirements.

In some embodiments, the authentication processor 353 can use voice biometrics technology to authenticate the caller, e.g., by sampling enough audio data in the caller's voice interaction with the IVR system 356 to perform the authentication. Any now known or later developed voice biometrics authentication system could be used in various embodiments. This can include leveraging previously recorded and processed speech by the caller and repurposing prior voice data to improve caller authentication.

In some embodiments, the authentication processor 353 can include voice biometrics authentication processing, e.g., such as provided by VocalPassword™ and/or FreeSpeech™, both presently offered by Nuance Communications, Inc. VocalPassword is a biometric authentication system that authenticates a caller when the caller speaks a simple passphrase to validate its identity. And FreeSpeech is a biometric authentication system that authenticates a caller by listening to their normal conversation with the IVR, where the input of passwords and/or PINs is not required. The dialog example in FIG. 4 demonstrates interactions between the IVR system 356 and caller device 10 where the authentication processor 353 is invoked.

In some embodiments, other forms of authentication can be used, e.g., such as techniques that use a password, a personal identification number (PIN), and/or other personally identifiable inputs.

The IVR system 356 can be configured to apply scripts, natural language processing, and/or conversational artificial intelligence to engage in a conversation with the caller via caller device 10 to obtain the call information (e.g., see FIG. 4), including for the optional authentication processing discussed above. The IVR system 356 can engage with the caller device 10 to populate pre-existing call templates ultimately useful by a skill group for resolving the caller's issue.

In some embodiments, the IVR system 356 can interact with a wait time counter to determine an estimated wait time for availability of a live agent, and can indicate the estimated wait time to the caller as part of its caller interaction. The IVR system 356 can obtain call information and invite the caller to leave a voicemail describing the issue, which can form at least part of the call information. Therefore, the call information can include caller audio information, which can be recorded by the IVR system 356, in step 230. The call information can also include a caller identity and/or caller account information. The call information can be stored as electronic information, which can include a phone number and account information associated with the caller and/or the caller device 10 as well as the recorded audio. Some or all of the files can be encrypted.

Once the caller has left its voicemail and it has been recorded, the IVR system 356 can terminate the call with the caller device 10, in step 235. The deflection and response system 350 can task its text processor 358 to send a text message (see arrow 3) to the caller's device 10 confirming the issue to be resolved and/or that a resolution will be forthcoming later via text message, in step 237. The text message can include a ticket and/or tracking number. The test message can be communicated to the caller device 10 via a multi-media messaging gateway 380.

In step 240, the deflection processor 352 tasks a transcription processor 354 to transcribe the stored audio files from the caller information, such as a caller voice message, producing transcribed audio files and information. Transcribing the spoken and/or recorded audio words can be done in real-time or from stored audio files using, for example, a Transcription Engine/Natural Language Engine, such as the Nuance Transcription Engine (NTE) or other speech-to-text engine, to determine concepts and intents associated with the call. The transcription processor 354 can assign a transcription confidence score to the transcription.

In step 250, a classifier 355 analyzes the call information, including the stored transcribed audio files, to determine concepts and intents of the caller. The classifier 355 can implement various techniques for analyzing and understanding concepts and intents of the caller from at least the transcribed audio files. In some embodiments, the classifier 355 can analyze the transcribed text for the presence of meaningful and/or predetermined words, phrases, and concepts in the transcription. In some embodiments, the classifier 355 can be configured to utilize natural language processing and understanding techniques and/or conversational artificial intelligence techniques for determining the concepts and intents.

The classifier 355 may further access account information of an authenticated caller, which may be included or indicated in the call information files, or accessible from back-end systems 320. Such account information could indicate an account status, a past due account, a service interruption, a prior service call, a recent change in service options, and so on. Such information can be used as a meaningful context for interpreting the transcribed audio to determine the concepts and intents and, ultimately, the issue to be resolved.

The classifier 355 determines an appropriate skill group to take responsibility for the call based on the determined contents and intents. Once the skill group is determined, the deflection and response system 350 can prepare and send information and files, preferably grouped in an electronic folder, to a response system 360 including the selected skill group. The electronic folder can include the transcribed text from the caller's audio, and one or more of a transcription confidence score, the caller audio files, a customer identification, authentication credentials, and other data from the backend systems 320, as well as an identification of an assigned skill group. The deflection and response system 350 can prepare preformatted research templates (e.g., based on the selected skill group) and a preformatted "canned" response template with data-fill used to populate available response information. These files can be included in the folder sent to the response system 360. The assigned specialist from the selected skill group will complete and finalize the response.

The response system 360 tasks a resolution processor or system 362 to determine a resolution to the caller's issue, in step 260. Depending on the caller's issue, as examples, the resolution can be a solution to a problem, information satisfying an information request, a service ordered, adjusted, or cancelled, a billing adjustment, an account information update, instructional content, or any other action or content responsive to the caller's issue.

The resolution system 362 assigns responsibility for the call to the skill group selected by the deflection and response system 350. Within the selected skill group, a specialist (A, B, . . . ) can take responsibility for the resolution. The resolution system 362 can access backend systems 320 and knowledge bases 322 and/or third-party systems 370 to research the issue and determine a resolution, candidate resolutions, and/or resolution options. Such third-party systems 370 can include, but are not limited to, information systems, diagnostic systems, subject matter expert systems, and the like. The back end systems 320 and knowledge bases 322 and/or third-party systems 370 can serve as research information sources, e.g., electrically accessible by the resolution system 362. In some embodiments, the resolution system 362 can assign the call resolution to a skill group or specialist, i.e., a response entity, after automatically querying the backend systems 320 and/or the $3^{rd}$ party systems 370 and, optionally, the assigned response entity could subsequently access the backend systems 320 and/or the $3^{rd}$ party systems for further information.

Depending on the response type indicated by the caller, e.g., text response or callback response, the resolution system 362 can forward the issue response information to either a text processor 364 (step 270) or a callback processor 365 (step 280).

In step 270, the text processor 364 generates and sends a text message (arrow 4) to the caller's electronic device 10 with an issue response communicating the resolution determined in step 260. The test message can be communicated to the caller device 10 via a multi-media messaging gateway 380.

In various embodiments, the response (arrow 4) to the caller can be a SMS/MMS/RCS/iMessage text message or an Apple Business Chat message that supports rich media, such as videos, GIFs, deep links, and transmits in-call multimedia. The text message preferably resolves the issue. But, in the event that the text message does not provide a final resolution, the text message can serve as a first message in a text or chat session between the caller at the electronic device 10 and a chat entity at the response system 360. Therefore, in some embodiments, the text processor 364 can remain in a chat session with the electronic device 10 until the session is terminated by the electronic device 10 or is timed out.

If the caller indicated a callback response type, rather than a text response type, the method moves from step 260 to step 280 in FIG. 2. In step 260, a specialist from the appropriate skill group of the resolution system 362 researches the issue and in step 280 a call agent calls back the caller (e.g., at caller device 10 or other call device indicated by the caller) via the callback processor 365. The callback processor 365 creates a callback record containing the caller contact, callback time, and personalized context-based details about the issue response. The record is then inserted into the callback queue 366 until resources are available on the voice media gateway 390 to perform the callback. A specialist who initiates a callback or handles a scheduled callback can use the details in the callback record to address the caller's issue.

Thus, in step 280, the resolution system 362 invokes the callback processor 365 to generate a callback event request, which includes personalized context-based details about the response, in a callback queue 366 that initiates an immediate or scheduled voice callback to the caller's electronic device 10. In various embodiments, the callback queue 366 stores all callback records and retains the caller's position in the queue.

The voice callback response (arrow 5 in FIG. 3) to the caller will connect the caller device 10 with a specialist and also contain any context-based details identified by the resolution processor 362 to assist the specialist in resolving the caller's issue. In various embodiments, a voice media gateway 390 provides the telephony resources to initiate the callback to the caller and connect the specialist to the caller device, again arrow 5 in FIG. 3. Therefore, in step 280, the callback processor 365 initiates a voice call (arrow 5) to the caller's device 10 using the voice media gateway 390 at the time specified in the callback record in the callback queue 366.

In some embodiments, the resolution system 362 and the text processor 364 can include or take the form of a chat platform including and/or accessible by one or more chat agents or chatbots, as a chat entity. That is, in some embodiments, the response system 360 can be a chat platform. In some embodiments, the chat platform can take the form of or include, for example, the Nina® platform provided by Nuance Communications, Inc., which is an intelligent enterprise virtual assistant that integrates with the popular internet-of-things (IoT).

The resolution system 362 can include a plurality of different skill groups, each comprised of specialists (A, B, . . . ). The resolution system 362 can be configured to route the call responsibility, and associated files, to a particular skill group corresponding to the determined concepts and intents indicated by the deflection and response system 350. For instance, a billing issue can be routed to a billing skill group, a request for new services can be routed to a sales skill/chat group, a technical issue can be routed to a technician or engineer skill/chat group, and so on. Within the appropriate skill/chat group, a particular specialist A, B, . . . within the group, whether a chat agent or chatbot, can take responsibility for resolution of the call.

Preferably, an assigned chat entity has access to and training on all of the necessary billing, CRM systems, knowledge bases, and other systems-of-record necessary to enable and empower that chat entity to access enough information to resolve that caller's issue in as few steps as possible, preferably with a first and only text message (arrow 4). Such access can allow a chat agent or a chatbot to personalize a text response based on that specific and unique caller's intent and account. The result is an improved caller experience and service delivered at a far lower cost. Each successfully deflected call yields an immediate financial benefit in the form of lower cost of transaction, and potentially a mid and long-term benefit by moving the caller from a high-cost service channel (Voice) to a lower cost digital channel on an ongoing basis.

Therefore, provided is a deflection and response system and method that deflect voice calls to an appropriate skill group and specialist with information necessary to resolve a caller's issues with, preferably, a single text message response. In some embodiments, the caller can state a reason for the call and responsibility for resolution of the issue raised by the caller can be deflected to a response system 360, for a callback response from a specialist or a text message response by a chat entity, e.g., a chat agent or a chatbot. Therefore, according to the method, calls can be handled by the IVR system 356 of the deflection and response system 350, where the caller is prompted to provide a detailed reason for the call, from which a context, concepts, caller intents, and/or caller issue can be determined so that an assigned response entity, e.g., a chat agent/bot or call agent, can resolve the caller's issue with minimal inconvenience to the caller.

In various embodiments, the caller's voice message is transcribed by the transcription processor 354, e.g., using natural language understanding (NLU) technology, to determine concepts and intents of the call, from at least the transcribed audio. Based on the determined concepts and intents, the deflection processor 352 routes responsibility for the call to the response system 360, which includes a resolution system 362, a text processor 364 and a callback processor 365. The resolution system 362 can include one or more skill groups, where each skill group can have a predefined subject matter area of responsibility, skill, or expertise. A skill group can be a specialized group that could be predefined on the resolution system 362. A skill group can include one or more response entities, such as human call agents or chat entities, e.g., chat agents and/or chatbots, which are available for resolving the issue. Response entities of a skill group can be specialists having competency, skills, experience, and information access necessary to resolve the caller's issue.

In various embodiments, the deflection and response system 350 and method 100/200 will:
Transcribe the caller's voice message
Categorize intent/issue of the voice message using an NLU classifier
Optionally, authenticate the caller using biometrics or other technology
Obtain customer account information and metadata from CRM, the caller's electronic device, or other systems
Assign the call, based on the intent/issue, to a response entity of a resolution system, such as a human agent, a chatbot, or a chat agent
Send an immediate automated acknowledgement to the caller device, advising the caller that its message was received, assigned to a response entity, a "ticket/customer" number was assigned, and that a reply to their issue will be sent when researched
Research the issue (e.g., question/request)
Resolve caller's issue by replying with an informed callback or a context-based text-message that includes a personalized response, e.g., with free form answer and one-time rich media link In various embodiments, all of the above functions can be automated, provided with minimal or no human interaction within the deflection and response system 350.

Preferably, the resolution system 362 will have available to it transcriptions, audio files, and/or customer information such that the assigned response entity will be able to research the caller's issue and, in the case of a text response, send a chat message to the caller via the text processor 364, e.g., over SMS/RCS/iMessage, with a response to the caller's issue. The objective is to provide the response entity with enough information to enable the response entity to resolve the caller's issue in one responsive callback or text message.

In various embodiments, the transcription processor 354 can be configured to generate the transcriptions with a transcription confidence score. If the confidence score is above a certain threshold, and an issue can be determined, the deflection and response system 350 can text a message to the caller device 10 that the issue is being worked. If the confidence score is below the threshold, and an issue cannot be determined, the deflection and response system 350 can communicate with the caller to obtain more information or perform additional analysis.

The deflection and response system 350 can be configured to deflect responsibility for the call based on the determined concepts and intents to a particular skill group from a plurality of available specialized skill groups. Each specialized skill group can have a specific subject matter expertise, skill, and/or area of responsibility. Each skill group can be a different skill group on of the resolution system 362. A response entity, e.g., a human call agent or a chatbot or a chat agent (either a "chat entity"), within the specialized skill group can be associated with resolving the caller's issue. In various embodiments, the response entity can receive at least the following information:

Asynchronous chat/callback request
Ticket/case/customer number
Transcribed text
Issue Category/Intent/Summary
Customer info/container/metadata
Audio files (e.g., in NTE format)
Transcription confidence score
Preformatted research template (e.g., based on issue category or subject matter)
Preformatted canned response with data-filled fields A folder can be created that includes a set of files associated with the call and the responsibility to resolve the caller's issue. The set of files can include transcribed text from audio, customer identification and authentication credentials, such as CRM and other data, an .mp4 audio file, a transcription confidence score, and identification or indication of response entity assigned. This folder can be routed to a response entity for resolution. One or more files, or the entire folder, and can be encrypted.

In some embodiments, a separate process can be used create a tracking ticket assigned for each transaction, i.e., caller issue. The tracking ticket can be used by the customer if it needs to follow up on the transaction. The tracking number and an acknowledgement can be sent to the caller's electronic device 10 via an SMS/MMS/RCS/iMessage text message (or other form of text or chat message) using a multi-media messaging gateway 380.

Once the issue is researched and a response determined, the response system 360 sends the personalized text message as a response (arrow 4) to the caller's electronic device 10 or initiates a callback (arrow 5) to the caller's electronic device 10, depending on the indicated response type. In various embodiments, in the case of a text response, a chat session remains (also arrow 4) with the chat entity or is reassigned and transferred to a separate chat entity (or chat group) responsible for keeping the chat session open for the caller in case a further response is immediately necessary. At this stage, the chat session can be treated the same as other asynchronous chats on a chat platform.

Figure 2A:
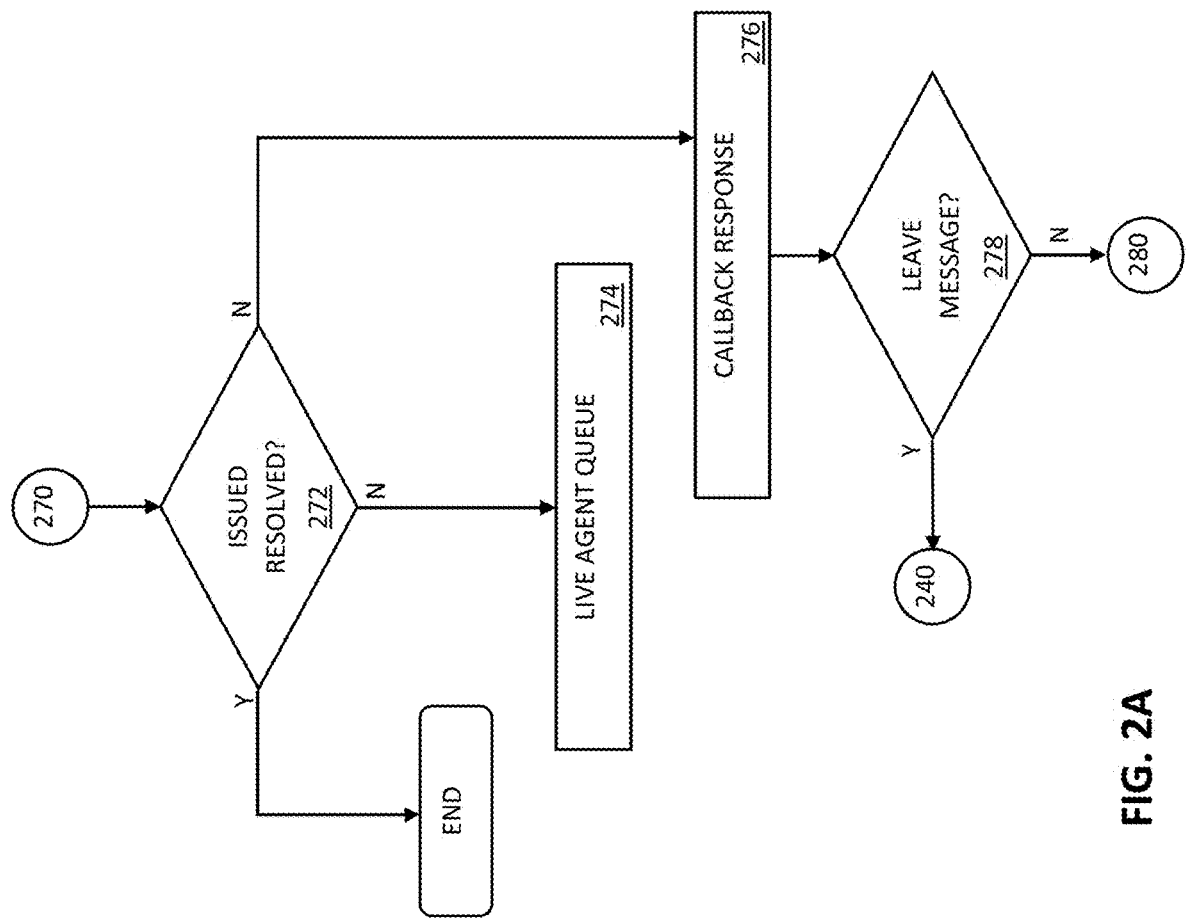
FIG. 2A is an embodiment of an optional method out of a text response session, in accordance with aspects of the inventive concepts.

FIG. 2A is an embodiment of an optional method out of a text response session, in accordance with aspects of the inventive concepts. The method out can be initiated by the user of the electronic device 10 responding to the text response or terminating a text chat session in any of a number of manners. Termination by the user of the electronic device 10 can take the form of responding to a text message or ending a text chat session with a departing salutation or confirmation of issue resolution, a technological end to the chat session, e.g., closing the text/chat application, opting to speak with a live operator, or opting for a callback response, i.e., shifting from a text response type to a callback response type.

From step 270 in FIG. 2, the method can proceed to step 272 of FIG. 2A, where the caller, via the electronic device 10, can indicate if the issue is resolved, e.g., by an electronic message responsive to the responsive text message or chat session from the text processor 364. If yes, the method can terminate or "END." If no, the user can, in some embodiments, transition to a live agent or live agent queue in step 274, e.g., at call center 340 or a specialist from a skill group on the resolution system 362. Or, in step 272, the caller can opt for a callback in step 276.

If a callback is chosen, the user can be prompted to leave a message in 278. If the user declines to leave a message in step 278, the original files, forms, research, and/or information generated from the original call in steps 230-260 in FIG. 2 can be maintained by the resolution system 362 for further issue resolution. This original files, forms, research, and/or information can be augmented with information from the concluding text session, e.g., text transcripts, for use by a specialist from the appropriate skill group to determine the further issue resolution. The specialist, after further analysis and/or research can initiate a callback via callback processor 365 (step 280) and voice media gateway 390 (arrow 5).

If, in step 278, the user chose to leave a message, the user could record an audio message and text the audio message back to the text processor 364. In various embodiments, the resolution system 360 could forward the audio message to the deflection and response system 350 for audio processing (step 240 in FIG. 2), e.g., by the transcription processor 354. The original files, forms, research, and/or text exchange could be maintained by the resolution system 362 and augmented with information from the concluding text session, e.g., text transcripts, and the audio message and associated files generated by the deflection and response system 350 from processing of the audio message, e.g., transcription files. Within the resolution system 362, a specialist from the appropriate skill group is assigned for issue resolution processing and callback via callback processor 365 and voice media gateway 390 (arrow 5).

FIG. 2B is an embodiment of an optional method out of a callback response session in step 280, in accordance with aspects of the inventive concepts. In this method, a determination is made of whether or not the issue has been resolved in step 282 by the callback. If the issue has been resolved, the method proceeds to "END." The call can be terminated by, for example, the caller via electronic device 10.

But if the issue was not resolved, and the callback needs to be terminated for further research and/or a different skill group or specialist, the caller can be given the option to be transferred to a different live agent or be put in a live agent queue in step 284, e.g., at call center 340 or a specialist from a skill group on the resolution system 362. Otherwise, the caller can be given an option to receive a text response in step 286 or receive another callback response in step 288, e.g., by the same or a different skill group or specialist.

In any callback scenario, the callback can be recorded. If recorded, and subsequent text response or callback response is needed, the recorded audio can be processed by the deflection and response system 350 (step 240 in FIG. 2). The original files, forms, research, and/or information generated from the original call can be maintained for use by the response entity for the subsequent text or callback response. In some embodiments, the original files, forms, research, and/or information can be augmented by information from the callback, e.g., an audio recording of the callback, a transcription of the callback, and/or response entity system entries and/or notes, as examples—also for use by the response entity for the subsequent text or callback response. In some embodiments, the caller can be given the option to leave a voice message, whether the callback was recorded or not. If so, the recorded audio message can be processed by the deflection and response system 350 as discussed above and used as part of the augmented information used subsequently by the response entity.

In some embodiments, if the subsequent response type was indicated to be another callback, transfer to the deflection and response system 350 can be omitted. Information from the concluding callback, e.g., recorded audio, can be forwarded to the resolution system 362 for response entity analysis, where the response entity preferably also has access to the information and files generated from the original call. The response entity can be the same call agent specialist that conducted the original callback, or a different call agent specialist. If there is recorded audio from the original callback exchange, it does not have to be processed by the deflection and response system 350 before going to the resolution system 362, such additional deflection and response system 350 processing can be optional. In some instances, the specialist that conducted the concluding callback can direct the issue to a different skill group and/or specialist for further processing and response with any recorded audio and system entries or notes from the original callback being electronically forwarded, stored, or otherwise made available for use by the different skill group and/or specialist.

Figure 4:
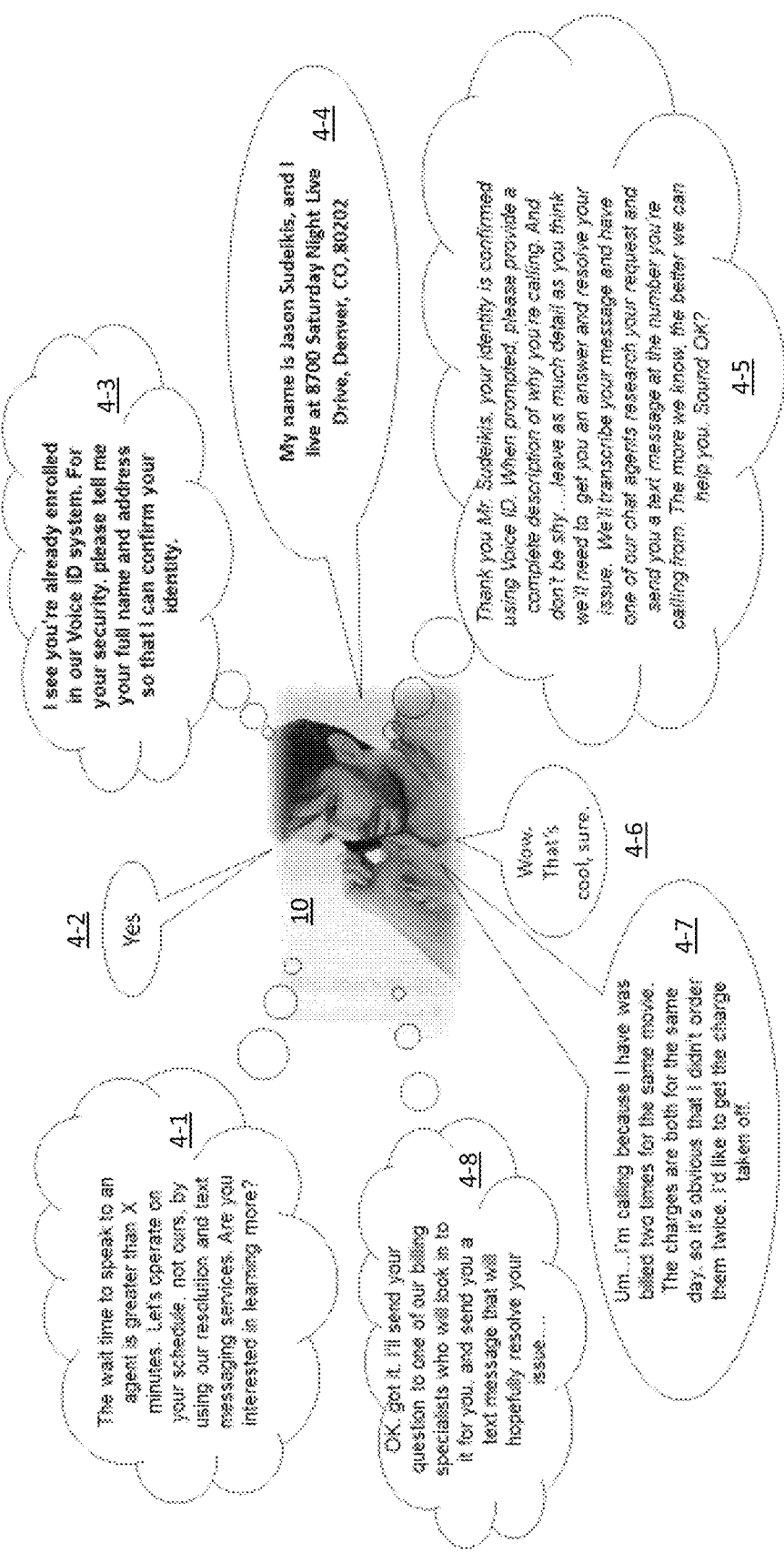
FIG. 4 is a diagram depicting an embodiment of a caller's audio interaction with the deflection and response system of FIG. 3 using a text response option, in accordance with aspects of the inventive concepts.

FIG. 4 is a diagram depicting an embodiment of an audio interaction between the caller using caller device 10 and the deflection and response system 350 of FIG. 3, in accordance with aspects of the inventive concepts. The interaction is depicted as arrow 2 in FIG. 3. In FIG. 4, an audio dialog is shown between the caller on electronic device 10 and the IVR system 356 of the deflection and response system 350. In 4-1, the IVR system 356 advises the caller of the wait time and offers the caller the option to use the deflection and response system 350 (or the "resolution and text message services"). In 4-2, the caller replies "yes," indicating that the deflection and response system 350 should continue the dialog. In 4-3 and 4-4 the caller is authenticated using an authentication processor, e.g., authentication processor 353. Authentication, such as voice biometrics authentication, is optional and can be provided as described herein above for example.

In 4-5, the caller is prompted by the IVR system 356 to provide a complete description of the reasons for the call, which is later transcribed to determine the issue needing resolution. In 4-6, the caller acknowledges the prompt and, in 4-7, the caller states its message. In 4-8, the IVR system 356 acknowledges the caller's audio message and provides a response indicating that the issue resolution will be later texted to the caller's device 10.

Figure 4A:
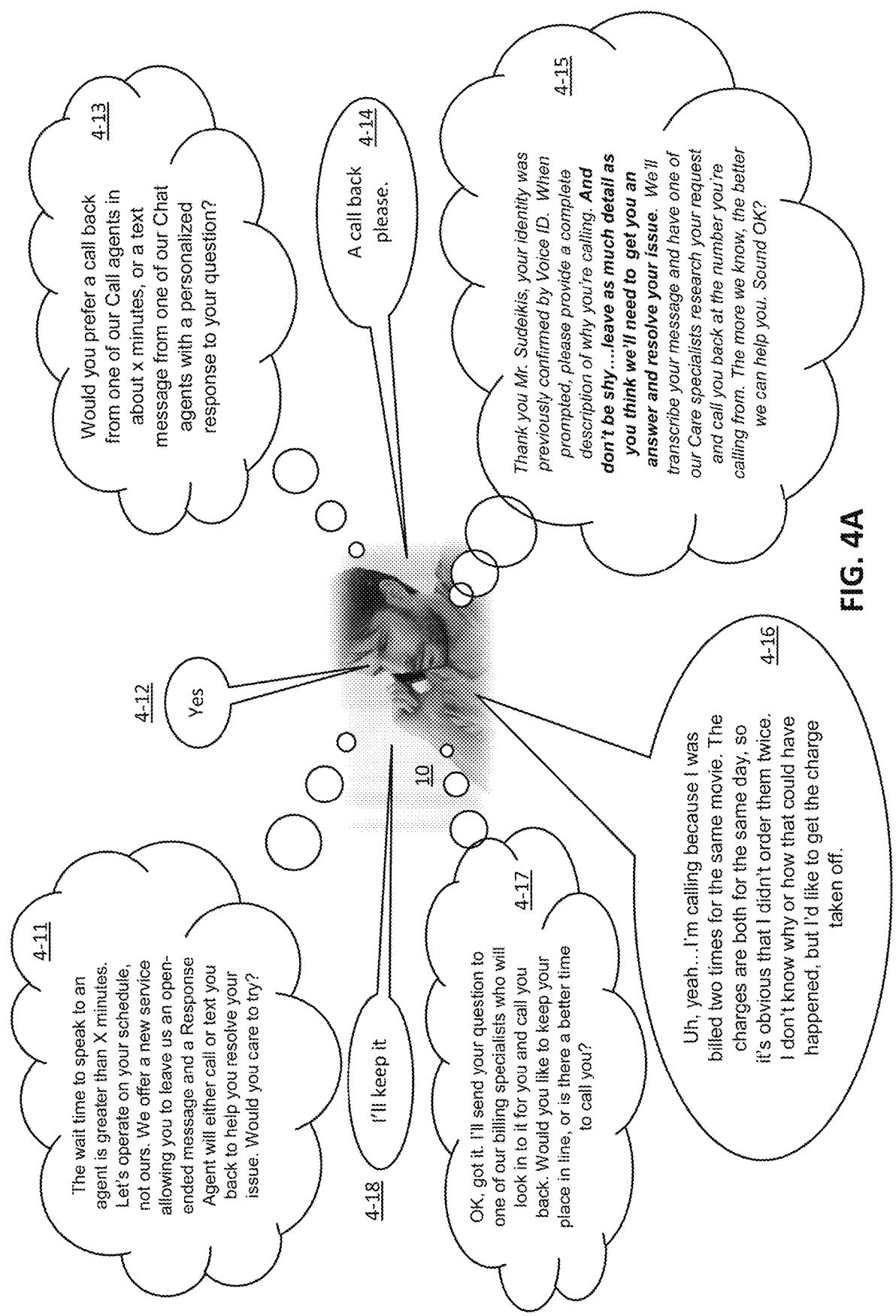
FIG. 4A is a diagram depicting an embodiment of a caller's audio interaction with the deflection and response system of FIG. 3 choosing a callback response option, in accordance with aspects of the inventive concepts.

FIG. 4A is a diagram depicting another embodiment of an audio interaction between the caller using caller device 10 and the deflection and response system 350 of FIG. 3, in accordance with aspects of the inventive concepts. The interaction is depicted as arrow 2 in FIG. 3. In FIG. 4A, an audio dialog is shown between the caller on electronic device 10 and the IVR system 356 of the deflection and response system 350. In 4-11, the IVR system 356 advises the caller of the wait time and offers the caller the option to use the deflection and response system 350 (or the "resolution and text message services"). In 4-12, the caller replies "yes," indicating that the deflection and response system 350 should assume responsibility for the dialog. In 4-13 the deflection and response system 350 asks the caller whether he prefers a callback or a text response. In 4-14 the caller requests a callback.

In 4-15 the deflection and response system 350 indicates that the caller has been authenticated, which can be optional. In 4-15, the caller is also prompted by the IVR system 356 to provide a complete description of the reasons for the call, which is later transcribed to determine the issue needing resolution. In 4-16, the caller acknowledges the prompt and states its message. In 4-17, the IVR system 356 acknowledges the caller's audio message and provides a response indicating that the issue will be forward to a specialists and asking the caller if he would like to keep his place in a callback queue or indicate a preferred callback time. In 4-18 the caller replies to the question, to keep his place in the callback queue. Subsequently, the deflection and response system 350 preforms the above indicated processing and transitions the resulting files to the response system 360, where the resolution system 362 makes the original files and information available to the appropriate response entity, here a call agent or specialist. Subsequently, the specialist conducts the callback to the caller device 10, or other designated callback device, arrow 5 in FIG. 3.

Figure 5A:
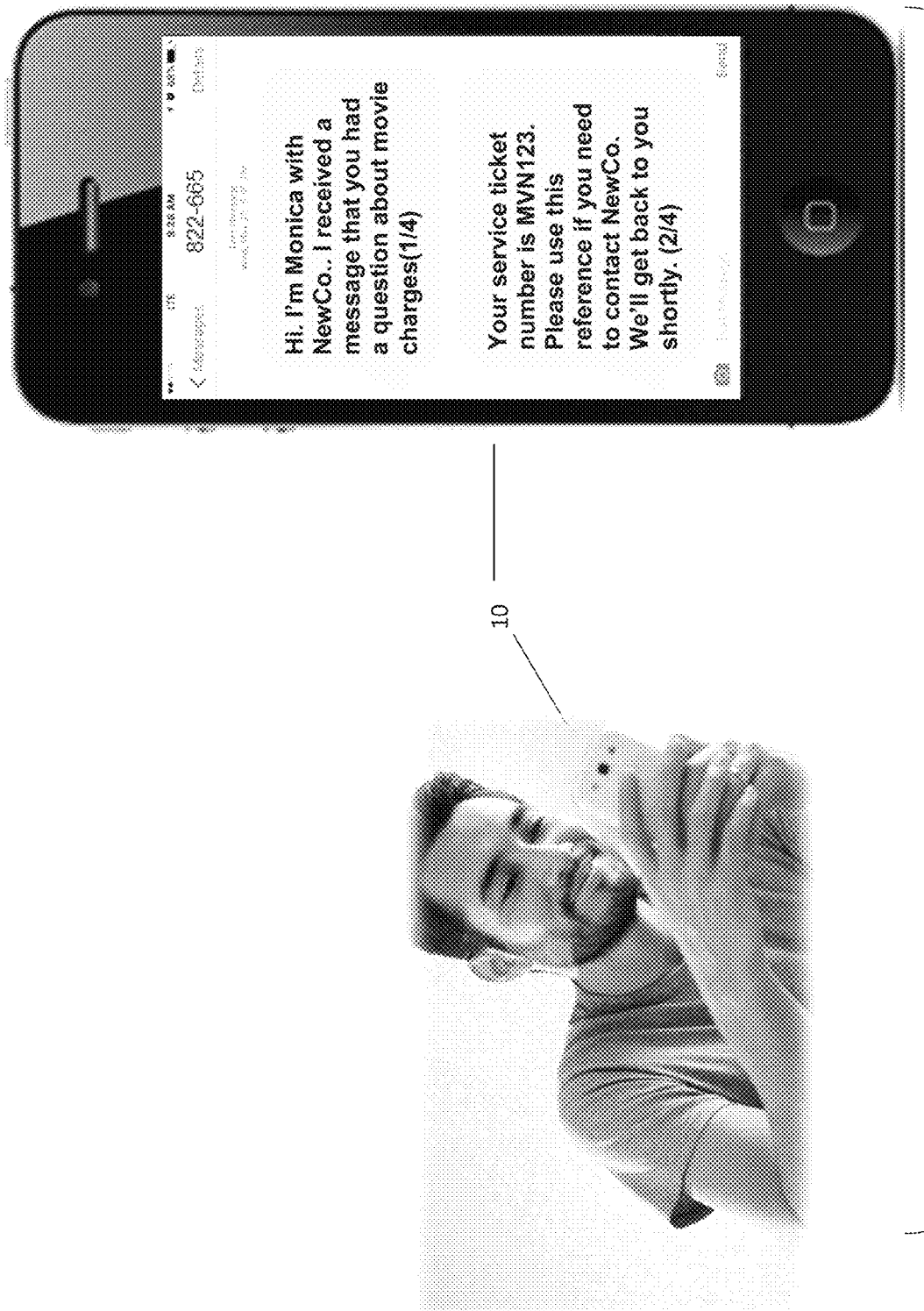
FIGS. 5A through 5C depict an embodiment of text message interactions between the caller's electronic device and the deflection and response system of FIG. 3, in accordance with aspects of the inventive concepts.
Figure 5B:
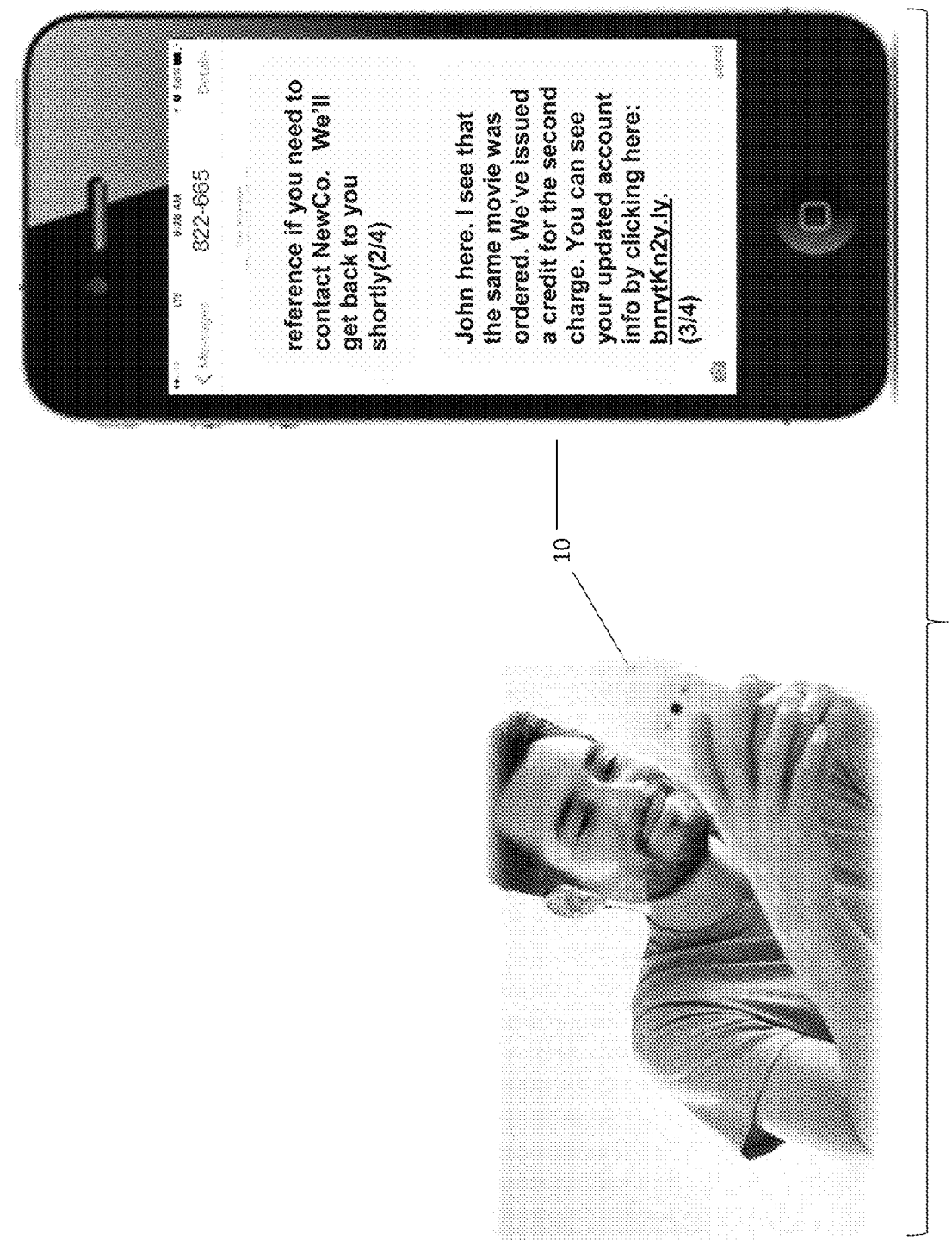
Figure 5C:
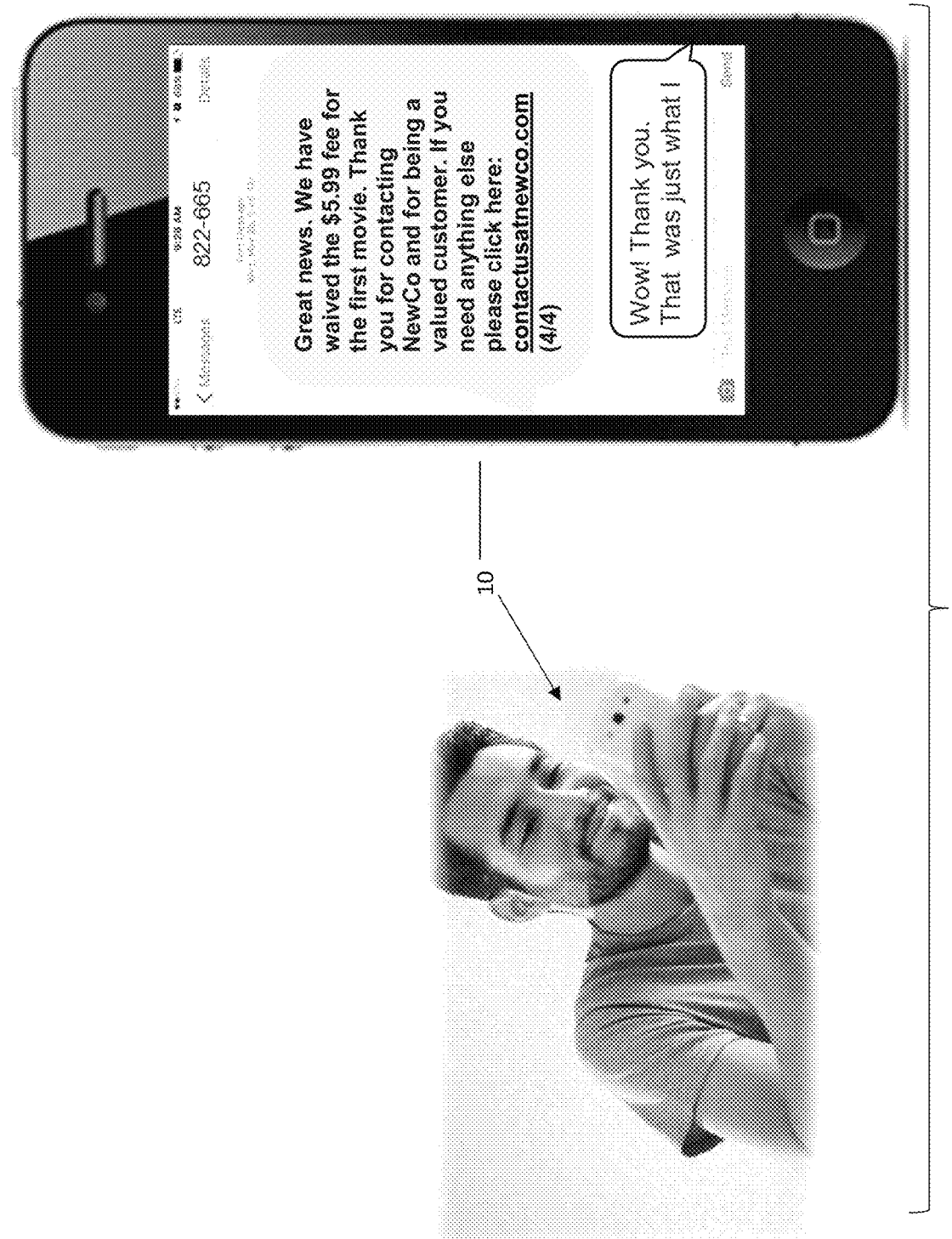

FIGS. 5A through 5C depict an embodiment of text interactions between the caller and the deflection and response system 350 of FIG. 1, in accordance with aspects of the inventive concepts. These figures depict an embodiment of a possible text exchange between the deflection and response system 350 and the caller's device 10 following the exchange between the IVR system 356 and the caller's device 10 in FIG. 4.

In FIG. 5A, the deflection and response system 350 sends an acknowledgement text to the caller's device 10. The communication is depicted by arrow 3 in FIG. 3. The acknowledgment text can be sent by the response system 360. In this embodiment, the text introduces a chat entity, here "Monica," and identifies the perceived issue, in message 1/4. In message 2/4, the text processor 364 provides a ticket number. The issue was determined, at least in part, based on the caller's voice message (see 4-7 in FIG. 4). This communication is depicted by arrow 3 in FIG. 3.

In FIG. 5B, in message 3/4, a new text from a specialized chat entity (or skill group) of the resolution system 362, here "John," introduces himself and provides the problem resolution—second movie charge is credited. As a chat entity, John can be a live chat agent or a chat bot, as examples. This communication is depicted as arrow 4 in FIG. 3.

In FIG. 5C, the chat platform 355 sends a follow-up message 4/4 indicating a further resolution of the issue—also waiving the first movie charge. The second resolution message 4/4 is optional and at the discretion of the chat entity. This communication is also depicted as arrow 4 in FIG. 3.

Provided, therefore, are a call deflection and response system and method; such systems and methods can deflect voice calls to a specific skill group of a response system, which is configured to resolve caller's issue by replying with context-based personalized response in the form of an informed callback or a SMS/MMS/RCS/iMessage text message or chat message or session, as examples. Callers are allowed to leave a detailed reason for their call with the IVR system of the deflection and response system, concepts and intents are determined from the caller's message. Based, at least in part, on the determined concepts and intents, the call is directed to a selected skill group of a resolution system to more quickly resolve the caller's issue or request. The resolution is provided via callback or text message to the caller, e.g., to the caller's mobile phone.

Systems and methods in accordance with the inventive concepts can be used broadly for all callers, callers on hold beyond a certain time threshold, callers having a particular issue, or they can be targeted to certain caller segments, such as high value, high volume, millennials, or other defined caller segments.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the invention, which are, for clarity, described in the context of separate embodiments, may also be provide in combination in a single embodiment. Conversely, various features of the invention which are, for brevity, described in the context of a single embodiment may also be provided separately or in any suitable sub-combination.

For example, it will be appreciated that all of the features set out in any of the claims (whether independent or dependent) can combined in any given way.

What is claimed is:

1. A call processing method, carried out by one or more processors accessing one or more computer memory, the method comprising:
   receiving an audio call from a caller device at an automated response system;
   engaging, by the automated response system, in a conversational dialogue with a caller;
   presenting a text response option to the caller; and
   in response to selection of the text response option during the conversational dialog:
      prompting the caller to leave a message and recording at least one audio file from the caller device;
      electronically transcribing the at least one audio file to form an electronic transcription, the at least one audio file describing an issue;
      processing the electronic transcription to determine concepts and intents of the audio call, the concepts and intents indicating a subject matter of the issue;
      determining a skill group from a plurality of skill groups based on the determined concepts and intents, the skill group having a predetermined association with the subject matter;
      compiling a set of files associated with the audio call, the set of files comprising the electronic transcription and an identification of the caller;
      electronically forwarding the set of files to the skill group for determining a first issue response; and
      electronically initiating a text response session with the caller associated with the first issue response;
      terminating the text response session based on a determination that the caller has opted to receive a callback response;
      augmenting the set of files with information from the text response session;
      electronically forwarding the augmented set of files to the skill group for determining a second issue response; and
      electronically initiating a callback to the caller associated with the second issue response.

2. The method of claim 1, further comprising electronically forwarding the at least one audio file and/or a transcription confidence score to the response system.

3. The method of claim 1, further comprising electronically authenticating the caller and/or the caller device associated with the audio call thereby yielding an authenticated caller and/or authenticated caller device.

4. The method of claim 3, wherein electronically authenticating the caller and/or the caller device includes using voice biometrics authentication processing.

5. The method of claim 3, further comprising:
   electronically accessing stored account information associated with the authenticated caller and/or the authenticated caller device; and
   electronically forwarding the stored account information to the response system.

6. The method of claim 1,
   wherein engaging in the conversational dialog includes an interactive voice response (IVR) system applying natural language processing and/or conversational artificial intelligence; and
   wherein the method further comprises:
      the IVR system terminating the audio call; and
      a text processor sending an acknowledgment text message to the caller device.

7. The method of claim 1, wherein transcribing the at least one audio file includes processing the at least one audio file using natural language processing.

8. The method of claim 1, further comprising:
   automatically prepopulating fields in an electronic pre-formatted response template with data based on the transcription; and
   electronically forwarding the electronic response template to the response system.

9. The method of claim 1, further comprising the response system electronically accessing one or more knowledge bases or systems to obtain information related to the subject matter.

10. The method of claim 1, further comprising receiving audio content from the caller device via the audio call, storing the audio content as the at least one audio file, terminating the audio call, and texting an acknowledgement to the caller device.

11. A call processing system, comprising:
    a voice response system configured to:
       receive an audio call from a caller device;
       engage in a conversational dialogue with a caller;
       present a text response option to the caller; and in response to selection of the text response option during the conversational dialog, prompt the caller to leave a message and record at least one audio file from the caller device;

a transcription processor configured to electronically transcribe the at least one audio file to form an electronic transcription, the at least one audio file describing an issue;

a classifier configured to:
analyze the electronic transcription to determine concepts and intents of the audio call, the concepts and intents indicating a subject matter of the issue;
determine a skill group from a plurality of skill groups based on the determined concepts and intents, the skill group having a predetermined association with the subject matter; and
compile a set of files associated with the audio call, the set of files comprising the electronic transcription and an identification of the caller;

a deflection processor configured to electronically forward the set of files to the skill group for determination of a first issue response; and the response system configured to initiate a text response session with the caller associated with the first issue response, the response system further configured to terminate the text response session based on a determination that the caller has opted to receive a callback response, wherein the classifier is further configured to augment the set of files with information from the text response session, the deflection processor is further configured to electronically forward the augmented set of files to the skill group for determining a second issue response, and the response system is further configured to initiate a callback to the caller associated with the second issue response.

12. The system of claim 11, wherein the deflection processor is further configured to electronically forward the at least one audio file and/or a transcription confidence score to the response system.

13. The system of claim 11, further comprising an authentication processor configured to electronically authenticate the caller and/or the caller device associated with the audio call thereby yielding an authenticated caller and/or authenticated caller device.

14. The system of claim 13, wherein the authentication processor is configured to electronically authenticate the caller and/or the caller device using voice biometics authentication processing.

15. The system of claim 13, wherein:
the authentication processor is configured to electronically access stored account information associated with the authenticated caller and/or the authenticated caller device; and
the deflection processor is configured to electronically forward the stored account information to the response system.

16. The system of claim 11, wherein the voice response system is an interactive voice response (IVR) system configured to apply natural language processing and/or conversational artificial intelligence,
wherein the IVR system is configured to terminate the audio call and the deflection and response system further comprises a text processor configured to send an acknowledgment text message to the caller device in response to termination of the call.

17. The system of claim 11, wherein the transcription processor is configured to use natural language processing to process the at least one audio file.

18. The system of claim 11, wherein the system is configured to:
automatically prepopulate fields in an electronic preformatted response template with data based on the transcription; and
electronically forward the electronic response template to the response system.

19. The system of claim 11, wherein the response system is configured to electronically access one or more knowledge bases or systems to obtain information related to the subject matter.

20. The system of claim 11, wherein the system is configured to receive audio content from the caller device via the audio call, store the audio content as the at least one audio file, terminate the audio call, and text an acknowledgement to the caller device.

21. The method of claim 1, wherein the text response session comprises a text message.

22. The method of claim 21, wherein the text message comprises alphanumeric words, phrases, numbers, icons, graphics, audio, video, hyperlinks, or a combination of two or more thereof.

23. The system of claim 11, wherein the text response session comprises a text message.

24. The system of claim 23, wherein the text message comprises alphanumeric words, phrases, numbers, icons, graphics, audio, video, hyperlinks, or a combination of two or more thereof.

* * * * *